(12) United States Patent
Schütze et al.

(10) Patent No.: US 7,261,955 B2
(45) Date of Patent: Aug. 28, 2007

(54) MCRALX ALLOY AND TURBINE COMPONENT HAVING PROTECTIVE LAYER MADE FROM MCRALX ALLOY

(75) Inventors: Michael Schütze, Aschaffenburg (DE); Werner Stamm, Mülheim an der Ruhr (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 11/357,565

(22) Filed: Feb. 17, 2006

(65) Prior Publication Data

US 2006/0257688 A1    Nov. 16, 2006

(30) Foreign Application Priority Data

Feb. 18, 2005    (EP)    ................... 05003583

(51) Int. Cl.
    *B32B 15/04*    (2006.01)
    *B32B 15/20*    (2006.01)
    *F01D 5/28*    (2006.01)
    *C22C 19/05*    (2006.01)
    *C22C 19/07*    (2006.01)

(52) U.S. Cl. ................ 428/696; 428/678; 420/437; 420/445; 148/325; 148/333; 148/425; 148/428; 416/241 R

(58) Field of Classification Search ........... 148/428, 148/425, 325, 333, 336; 420/445, 437, 112, 420/34, 104; 428/680, 678, 681, 696, 632; 416/241 R, 223 R, 229 R
See application file for complete search history.

(56) References Cited

U.S. PATENT DOCUMENTS

| 5,154,885 A | 10/1992 | Czech et al. |
| 5,268,238 A | 12/1993 | Czech et al. |
| 5,273,712 A | 12/1993 | Czech et al. |
| 5,401,307 A | 3/1995 | Czech et al. |
| 5,582,635 A | 12/1996 | Czech et al. |
| 5,599,385 A | 2/1997 | Czech et al. |
| 5,993,980 A | 11/1999 | Schmitz et al. |
| 6,024,792 A | 2/2000 | Kurz et al. |
| 6,475,297 B1* | 11/2002 | Rafferty et al. .............. 148/240 |
| 6,555,179 B1 | 4/2003 | Reeves et al. |
| 2002/0098294 A1* | 7/2002 | Lau et al. .................... 427/454 |
| 2004/0067320 A1* | 4/2004 | Spitsberg et al. ........... 427/404 |
| 2006/0141283 A1* | 6/2006 | Madhava .................... 428/651 |

FOREIGN PATENT DOCUMENTS

| EP | 0 412 397 A1 | 2/1991 |
| EP | 0 486 489 B1 | 5/1992 |
| EP | 0 489 659 A1 | 6/1992 |
| EP | 0 786 017 B1 | 7/1997 |
| EP | 0 892 090 A1 | 1/1999 |
| EP | 1 204 776 B1 | 5/2002 |
| EP | 1 306 454 A1 | 5/2003 |
| EP | 1 319 729 A1 | 6/2003 |
| EP | 1 319 730 A1 | 6/2003 |
| WO | WO91/02108 A1 | 2/1991 |
| WO | WO96/12049 A1 | 4/1996 |
| WO | WO99/67435 A1 | 12/1999 |
| WO | WO 00/44949 A1 | 8/2000 |

* cited by examiner

*Primary Examiner*—Michael E. Lavilla

(57) ABSTRACT

Protective layers of the MCrAlX type according to the prior art are often provided with a platinum layer to prevent diffusion of elements out of the base material into the MCrAlX. The MCrAlX alloy according to the invention includes halogens (F, Cl, Br, I), which prevent this diffusion, in particular of titanium.

11 Claims, 4 Drawing Sheets

MCRALX ALLOY AND TURBINE COMPONENT HAVING PROTECTIVE LAYER MADE FROM MCRALX ALLOY

CROSS REFERENCE TO RELATED APPLICATION

This application claims priority of the European application No. 05003583 EP filed Feb. 18, 2005, which is incorporated by reference herein in its entirety.

FIELD OF THE INVENTION

The invention relates to an alloy of MCrAlX type as claimed in the claims, to a protective layer as claimed in the claims and to processes for producing the protective layer as claimed in the claims.

BACKGROUND OF THE INVENTION

Thermal barrier coating systems are mostly used on nickel-base or cobalt-base systems as base material, in which case, to improve the mechanical properties, the proportion of the γ' phase is increased by additions of aluminum and titanium. However, since titanium has a very high diffusion coefficient at the temperatures of use, titanium diffuses from the base material into a bonding layer of the MCrAlX type in the layer system, where it is incorporated in the thermally grown aluminum oxide layer (TGO), so that titanium spinels, which have very unfavorable effects on the bonding of a ceramic layer above, are formed on the bonding layer.

The MCrAlX bonding layer is often coated with platinum in order to prevent this diffusion, but the costs of this are very high.

EP 0 489 659 B1 discloses a process for treating metals in which metallic halides are applied as a layer.

Therefore, it is an object of the invention to overcome the abovementioned problem.

SUMMARY OF THE INVENTION

The object is achieved by the MCrAlX alloy as claimed in the claims, the protective layer as claimed in the claims and production processes as claimed in the claims.

The subclaims list further advantageous measures which can be advantageously combined with one another in any desired way.

The invention consists in introducing elements of at least one halogen (fluorine [F], chlorine [Cl], bromine [Br], iodine [I]) into a layer of an MCrAlX alloy. On account of the low vapor pressure, these halogens inter alia trap the titanium atoms, so that they are immobilized in the metal lattice and scarcely any titanium atoms are able to reach the surface of a layer of an MCrAlX alloy and form spinels there.

In addition, the aluminum activity is also increased in such a manner that a homogenous α-aluminum oxide layer is formed. The application therefore also leads to a clear increase in the oxidation prevention action of layers based on MCrAlX.

DETAILED DESCRIPTION OF THE INVENTION

Figure 1:
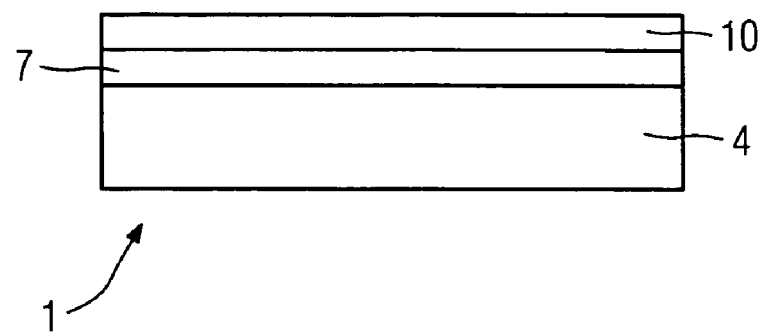
FIG. 1 shows a layer system.

FIG. 1 shows a layer system 1.
The layer system 1 comprises a substrate 4, a protective layer 7 as bonding layer and/or to protect against corrosion, based on the MCrAlX alloy according to the invention.

In addition, a ceramic layer 10 may but does not have to be arranged on the protective layer 7, serving as an additional thermal barrier.

Figure 4:
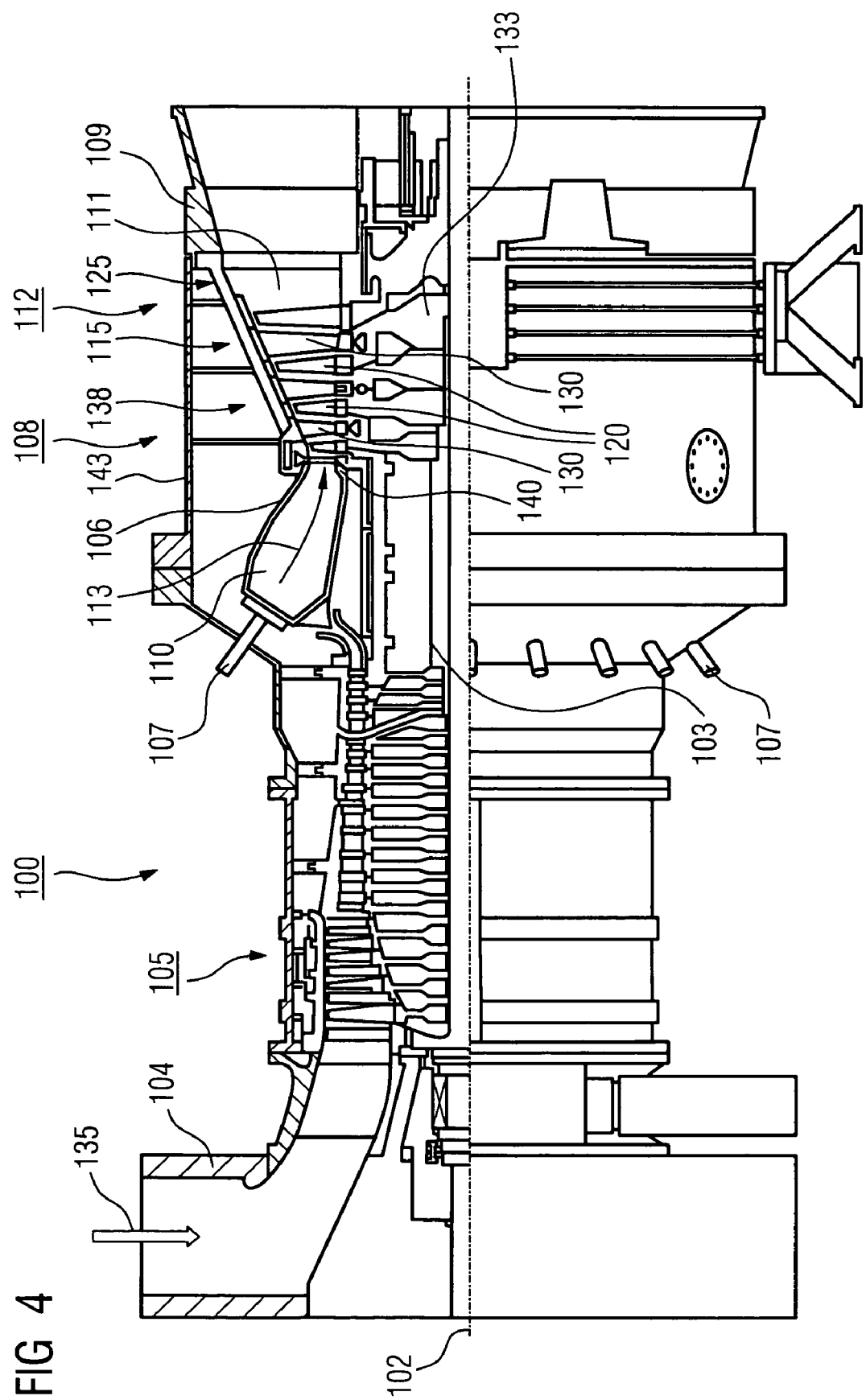
FIG. 4 shows a gas turbine.
Figure 5:
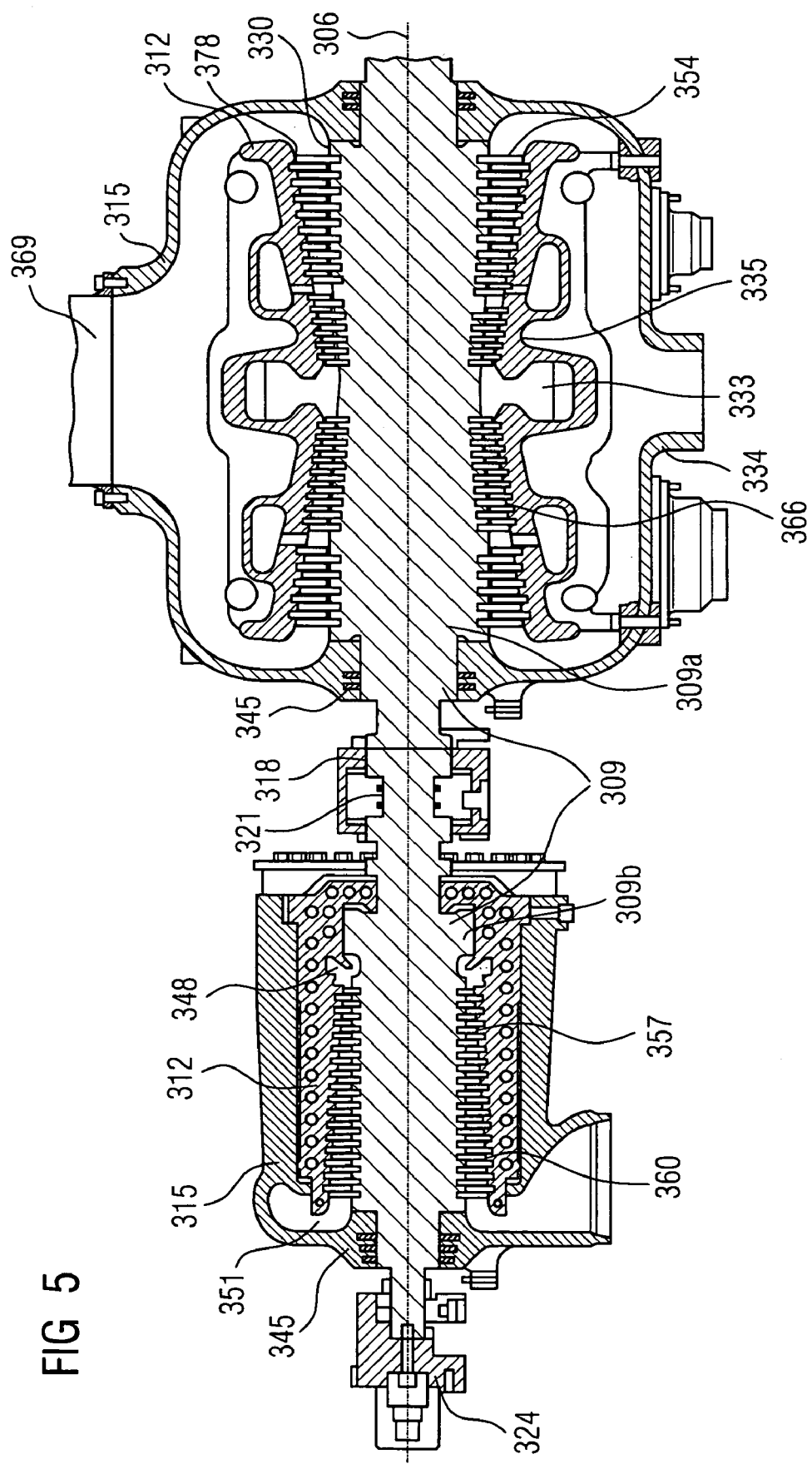
FIG. 5 shows a steam turbine.

Layer systems 1 of this type are used, for example, for components of turbines, for example of steam or gas turbines 100 (FIG. 4), on turbine blades or vanes 120, 130 (FIG. 2), heat shield elements 155 (FIG. 3), steam inflow regions 333 (FIG. 5).

In this context, M stands for at least one element selected from the group consisting of iron (Fe) and/or nickel (Ni) and/or cobalt (Co).

X stands at least for yttrium (Y), silicon (Si), hafnium (Hf) or at least one other element from the group of the rare earths.

Further constituents in the MCrAlX alloy, which serve to improve mechanical and/or corrosive properties, are possible.

Examples of an MCrAlX alloy are described in U.S. Pat. No. 5,401,307, U.S. Pat. No. 5,582,635, U.S. Pat. No. 5,599,385, EP 0 486 489, WO 91/02108, U.S. Pat. No. 5,154,885, U.S. Pat. No. 5,273,712, U.S. Pat. No. 5,268,238, EP 0 412 397, EP 0 786 017, WO 96/12049, U.S. Pat. No. 5,993,980, the chemical composition of which in each case forms part of the present disclosure.

The MCrAlX layer consists, for example, of 25-40 wt %, in particular 29-31 wt % nickel, 27-32 wt %, in particular 27-29 wt % chromium, 7-9 wt %, in particular 7-8 wt % aluminum, 0.3-1 wt %, in particular 0.5-0.7 wt % X, in particular Y, 0.3-2 wt %, in particular 0.3-0.7 wt % silicon, if appropriate with an addition of rhenium (Re): max: 3 wt % and a minimum cobalt content of 5 wt %, which also forms the remainder.

It is also possible for the halogens to be present in a rhenium-containing MCrAlX alloy.

A further advantageous MCrAlX alloy consists of 20-50 wt %, in particular 20-22 wt % chromium, 0-15 wt %, in particular 10.5-11.5 wt % aluminum, 0.3-2 wt %, in particular 0.3-0.5 wt % X, in particular Y, 1-20 wt %, in particular 1.5-2.5 wt % rhenium, optional addition of silicon: max. 2 wt %, in particular 11-13 wt % cobalt.

The remainder can consist of nickel. The remainder can also consist of cobalt, or the alloy may be based on nickel/cobalt.

A further MCrAlX alloy consists of 0-30 wt %, in particular 24-26 wt % cobalt, 15-26 wt %, in particular 16-18 wt % chromium, 9-15 wt %, in particular 9.5-11 wt % aluminum, 0.3-2 wt %, in particular 0.3-0.5 wt % X, in particular Y, 1-15 wt %, in particular 1.0-1.8 wt % rhenium, and optional addition of silicon (max: 2 wt %) and remainder nickel.

According to the invention, halogens or halides are introduced into this protective layer 7 at least in a subregion of the protective layer 7, in particular close to the substrate 4. The concentration of the at least one halogen can therefore, for example, have a gradient.

The halogens can be introduced in various ways.
1. Dip process with an MCrAlX layer in halogen-salt-containing solutions at room temperature followed by heat treatment (preferably 700° C.-1000° C.);
2. Dip process in halogen-containing organic liquids followed by heat treatment, preferably at temperatures of 700° C.-1000° C.;
3. Application of solid halogen-containing salts to an MCrAlX layer, for example by a powder pack process with subsequent heat treatment (preferably 700° C.-1000° C.);
4. Cooling of a warm MCrAlX layer in halogen-containing gas atmospheres;
5. Ion implantation of halogen ions into an MCrAlX layer.

It is also possible, for example, to use an installation which carries out what is known as the fluoride ion cleaning (FIC) process in order to introduce halogens into the MCrAlX alloy.

Further possible ways of introduction are possible.

A solution anneal (preferably 4 h at 1160° C.) and/or a precipitation heat treatment (preferably 24 h at 840° C.), depending on the material of the substrate 4, can be carried out with the MCrAlX layer 7 with the halogens.

It is also possible for halides, i.e. compounds of halogens and a further element (for example $AlF_3$, $AlCl_3$), to form in the protective layer 7 or to be produced directly during the production of the MCrAlX alloy or to be admixed with the MCrAlX protective layer 7 before the latter is applied to the base material that has to be protected.

The amount of halogens in the alloy as an element or as a constituent of a halide is, for example, at least 100 ppm, preferably at least 200 ppm or 300 ppm, and is for example at most 500 ppm, in particular at most 1000 ppm or 5000 ppm.

Figure 2:
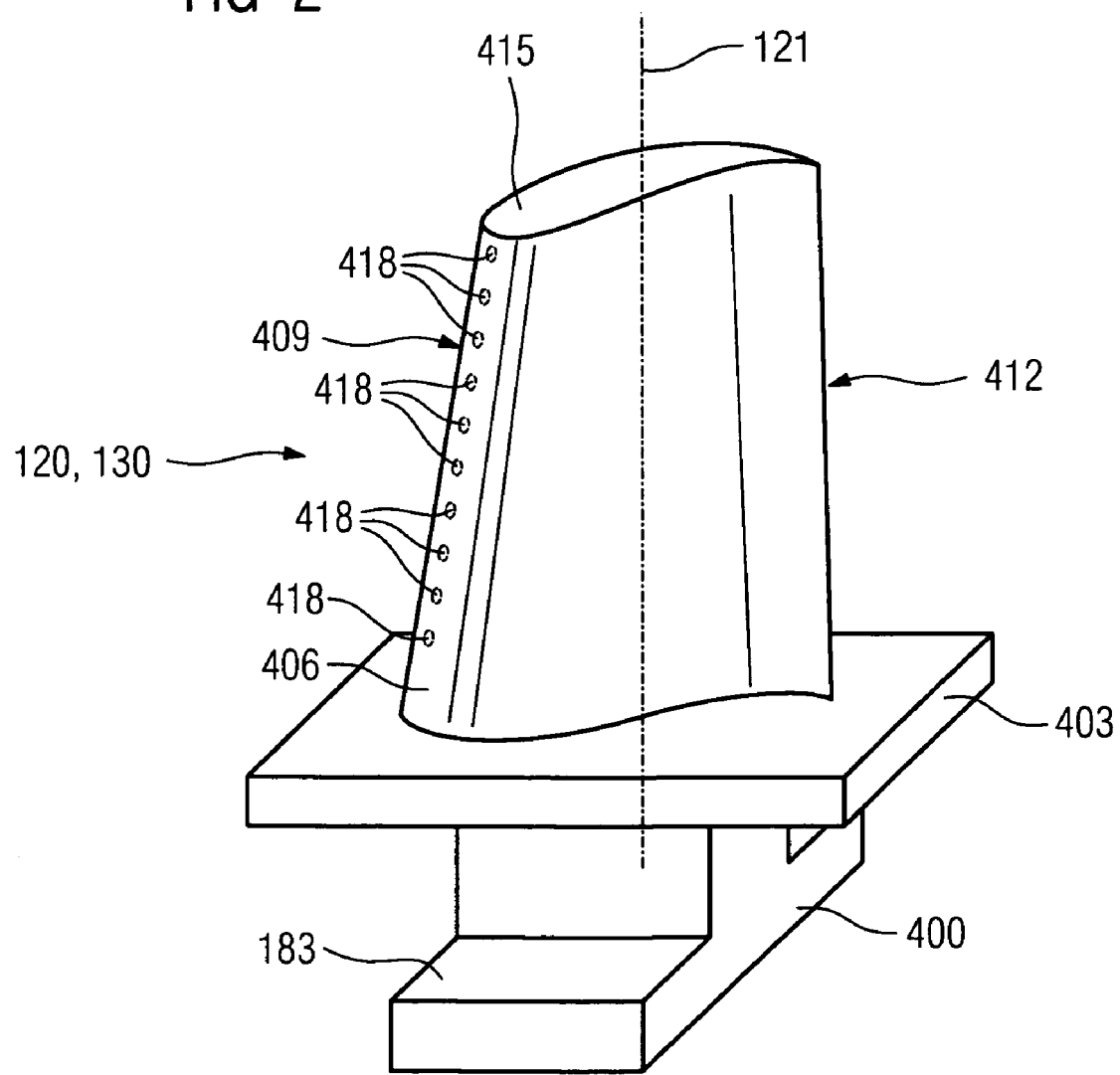
FIG. 2 shows a turbine blade or vane.

FIG. 2 shows a perspective view of a rotor blade 120 or guide vane 130 of a turbomachine 100, which extends along a longitudinal axis 121.

The turbomachine may be a gas turbine of an aircraft or of a power plant for generating electricity, a steam turbine or a compressor.

The blade or vane 120, 130 has, in succession along the longitudinal axis 121, a securing region 400, an adjoining blade or vane platform 403 and a main blade or vane part 406.

As a guide vane 130, the vane 130 may have a further platform (not shown) at its vane tip 415.

A blade or vane root 183, which is used to secure the rotor blades 120, 130 to a shaft or a disk (not shown), is formed in the securing region 400.

The blade or vane root 183 is designed, for example, in hammerhead form. Other configurations, such as a fir-tree or dovetail root, are possible.

The blade or vane 120, 130 has a leading edge 409 and a trailing edge 412 for a medium which flows past the main blade or vane part 406.

In the case of conventional blades or vanes 120, 130, by way of example solid metallic materials, in particular superalloys, are used in all regions 400, 403, 406 of the blade or vane 120, 130.

Superalloys of this type are known, for example, from EP 1 204 776 B1, EP 1 306 454, EP 1 319 729 A1, WO 99/67435 or WO 00/44949; these documents form part of the disclosure. The blade or vane 120, 130 may in this case be produced by a casting process, also by means of directional solidification, by a forging process, by a milling process or combinations thereof.

Workpieces with a single-crystal structure or structures are used as components for machines which, in operation, are exposed to high mechanical, thermal and/or chemical stresses.

Single-crystal workpieces of this type are produced, for example, by directional solidification from the melt. This involves casting processes in which the liquid metallic alloy solidifies to form the single-crystal structure, i.e. the single-crystal workpiece, or solidifies directionally.

In this case, dendritic crystals are oriented along the direction of heat flow and form either a columnar crystalline grain structure (i.e. grains which run over the entire length of the workpiece and are referred to here, in accordance with the language customarily used, as directionally solidified) or a single-crystal structure, i.e. the entire workpiece consists of one single crystal. In these processes, a transition to globular (polycrystalline) solidification needs to be avoided, since non-directional growth inevitably forms transverse and longitudinal grain boundaries, which negate the favorable properties of the directionally solidified or single-crystal component.

Where the text refers in general terms to directionally solidified microstructures, this is to be understood as meaning both single crystals, which do not have any grain boundaries or at most have small-angle grain boundaries, and columnar crystal structures, which do have grain boundaries running in the longitudinal direction but do not have any transverse grain boundaries. This second form of crystalline structures is also described as directionally solidified microstructures (directionally solidified structures).

Processes of this type are known from U.S. Pat. No. 6,024,792 and EP 0 892 090 A1; these documents form part of the disclosure.

The blades or vanes 120, 130 may likewise have protective layers 7 according to the invention protecting against corrosion or oxidation (MCrAlX; M is at least one element selected from the group consisting of iron (Fe), cobalt (Co), nickel (Ni), X is an active element and represents yttrium (Y) and/or silicon and/or at least one rare earth element, or hafnium (Hf)). Alloys of this type are known from EP 0 486 489 B1, EP 0 786 017 B1, EP 0 412 397 B1 or EP 1 306 454 A1, which are intended to form part of the present disclosure.

It is also possible for a thermal barrier coating, consisting for example of $ZrO_2$, $Y_2O_3$—$ZrO_2$, i.e. unstabilized, partially stabilized or completely stabilized by yttrium oxide and/or calcium oxide and/or magnesium oxide, to be present on the MCrAlX.

Columnar grains are produced in the thermal barrier coating by means of suitable coating processes, such as for example electron beam physical vapor deposition (EB-PVD).

Refurbishment means that after they have been used, protective layers may have to be removed from components 120, 130 (e.g. by sand-blasting). Then, the corrosion and/or oxidation layers and products are removed. If appropriate, cracks in the component 120, 130 are also repaired. This is followed by recoating of the component 120, 130, after which the component 120, 130 can be reused.

The blade or vane 120, 130 may be hollow or solid in form. If the blade or vane 120, 130 is to be cooled, it is hollow and may also have film-cooling holes 418 (indicated by dashed lines).

Figure 3:
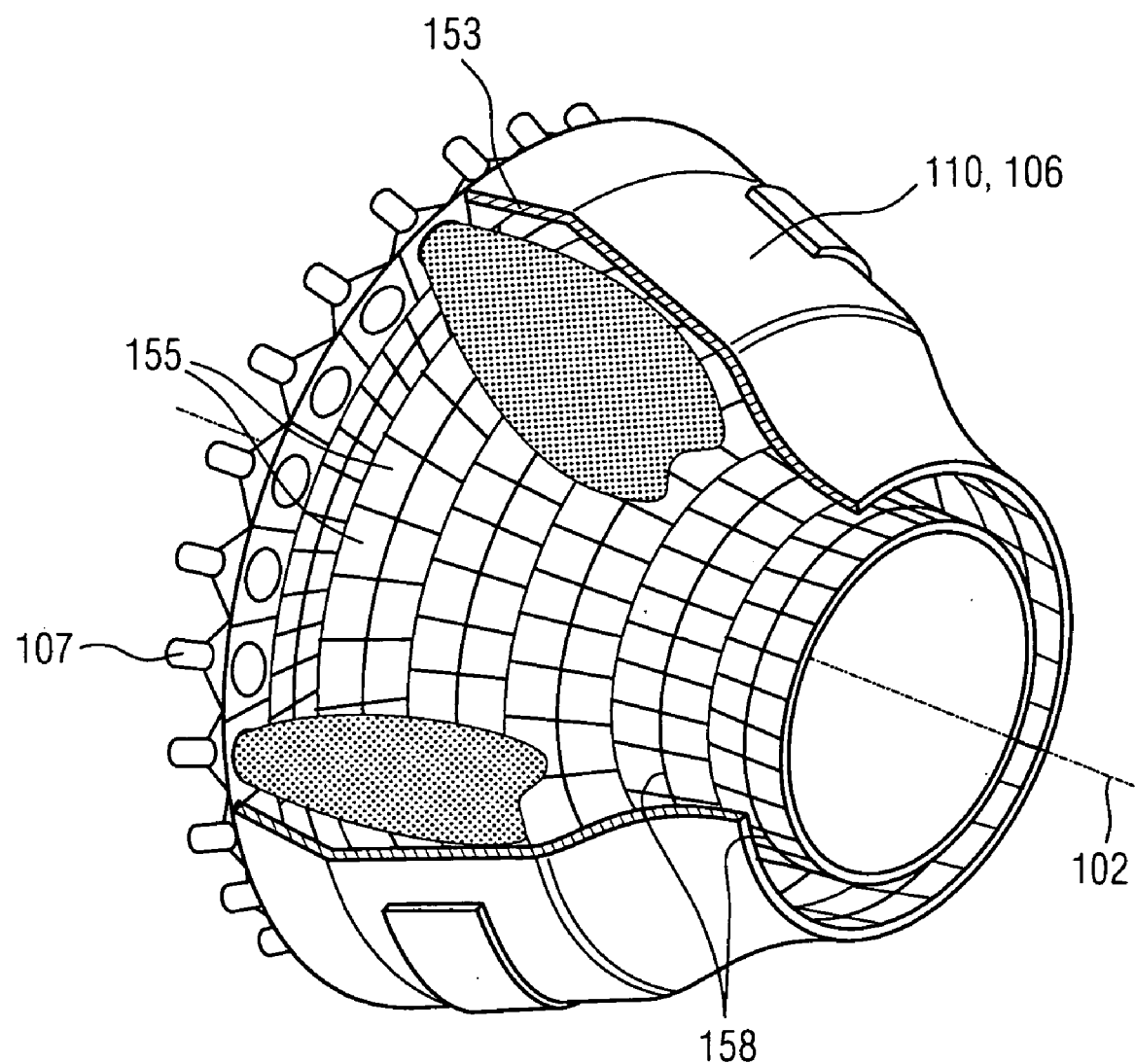
FIG. 3 shows a combustion chamber.

FIG. 3 shows a combustion chamber 110 of a gas turbine. The combustion chamber 110 is configured, for example, as what is known as an annular combustion chamber, in which a multiplicity of burners 107 arranged circumferentially around the axis of rotation 102 open out into a common combustion chamber space. For this purpose, the combustion chamber 110 overall is of annular configuration positioned around the axis of rotation 102.

To achieve a relatively high efficiency, the combustion chamber 110 is designed for a relatively high temperature of the working medium M of approximately 1000° C. to 1600° C. To allow a relatively long service life even with these operating parameters, which are unfavorable for the materials, the combustion chamber wall 153 is provided, on its side which faces the working medium M, with an inner lining formed from heat shield elements 155.

On the working medium side, each heat shield element 155 is equipped with a particularly heat-resistant protective layer or is made from material that is able to withstand high temperatures. These may be solid ceramic bricks or alloys with MCrAlX and/or ceramic coatings.

The materials of the combustion chamber wall and their coatings may be similar to the turbine blades or vanes 120, 130.

A cooling system may also be provided for the heat shield elements 155 and/or their holding elements, on account of the high temperatures in the interior of the combustion chamber 110.

FIG. 4 shows, by way of example, a partial longitudinal section through a gas turbine 100.

In the interior, the gas turbine 100 has a rotor 103 which is mounted such that it can rotate about an axis of rotation 102 and is also referred to as the turbine rotor.

An intake housing 104, a compressor 105, a, for example, toroidal combustion chamber 110, in particular an annular combustion chamber 106, with a plurality of coaxially arranged burners 107, a turbine 108 and the exhaust-gas housing 109 follow one another along the rotor 103.

The annular combustion chamber 106 is in communication with a, for example, annular hot-gas passage 111, where, by way of example, four successive turbine stages 112 form the turbine 108.

Each turbine stage 112 is formed, for example, from two blade or vane rings. As seen in the direction of flow of a working medium 113, in the hot-gas passage 111 a row of guide vanes 115 is followed by a row 125 formed from rotor blades 120.

The guide vanes 130 are secured to an inner housing 138 of a stator 143, whereas the rotor blades 120 of a row 125 are fitted to the rotor 103 for example by means of a turbine disk 133.

A generator (not shown) is coupled to the rotor 103.

While the gas turbine 100 is operating, the compressor 105 sucks in air 135 through the intake housing 104 and compresses it. The compressed air provided at the turbine-side end of the compressor 105 is passed to the burners 107, where it is mixed with a fuel. The mix is then burnt in the combustion chamber 110, forming the working medium 113. From there, the working medium 113 flows along the hot-gas passage 111 past the guide vanes 130 and the rotor blades 120. The working medium 113 is expanded at the rotor blades 120, transferring its momentum, so that the rotor blades 120 drive the rotor 103 and the latter in turn drives the generator coupled to it.

While the gas turbine 100 is operating, the components which are exposed to the hot working medium 113 are subject to thermal stresses. The guide vanes 130 and rotor blades 120 of the first turbine stage 112, as seen in the direction of flow of the working medium 113, together with the heat shield bricks which line the annular combustion chamber 106, are subject to the highest thermal stresses.

To be able to withstand the temperatures which prevail there, they have to be cooled by means of a coolant.

Substrates of the components may likewise have a directional structure, i.e. they are in single-crystal form (SX structure) or have only longitudinally oriented grains (DS structure).

By way of example, iron-base, nickel-base or cobalt-base superalloys are used as material for the components, in particular for the turbine blade or vane 120, 130 and components of the combustion chamber 110.

Superalloys of this type are known, for example, from EP 1 204 776 B1, EP 1 306 454, EP 1 319 729 A1, WO 99/67435 or WO 00/44949; these documents form part of the disclosure.

The blades or vanes 120, 130 may also have coatings which protect against corrosion (MCrAlX; M is at least one element selected from the group consisting of iron (Fe), cobalt (Co), nickel (Ni), X is an active element and represents yttrium (Y) and/or silicon and/or at least one rare earth element or hafnium). Alloys of this type are known from EP 0 486 489 B1, EP 0 786 017 B1, EP 0 412 397 B1 or EP 1 306 454 A1, which are intended to form part of the present disclosure.

A thermal barrier coating, consisting for example of $ZrO_2$, $Y_2O_3$—$ZrO_2$, i.e. unstabilized, partially stabilized or completely stabilized by yttrium oxide and/or calcium oxide and/or magnesium oxide, may also be present on the MCrAlX. Columnar grains are produced in the thermal barrier coating by suitable coating processes, such as for example electron beam physical vapor deposition (EB-PVD).

The guide vane 130 has a guide vane root (not shown here), which faces the inner housing 138 of the turbine 108, and a guide vane head which is at the opposite end from the guide vane root. The guide vane head faces the rotor 103 and is fixed to a securing ring 140 of the stator 143.

FIG. 5 illustrates, by way of example, a steam turbine 300, 303 with a turbine shaft 309 extending along an axis of rotation 306.

The steam turbine has a high-pressure part-turbine 300 and an intermediate-pressure part-turbine 303, each with an inner casing 312 and an outer casing 315 surrounding it.

The high-pressure part-turbine 300 is, for example, of pot-type design.

The intermediate-pressure part-turbine 303 is of two-flow design.

It is also possible for the intermediate-pressure part-turbine 303 to be of single-flow design.

Along the axis of rotation 306, a bearing 318 is arranged between the high-pressure part-turbine 300 and the intermediate-pressure part-turbine 303, the turbine shaft 309 having a bearing region 321 in the bearing 318. The turbine shaft 309 is mounted on a further bearing 324 next to the high-pressure part-turbine 300. In the region of this bearing 324, the high-pressure part-turbine 300 has a shaft seal 345. The turbine shaft 309 is sealed with respect to the outer casing 315 of the intermediate-pressure part-turbine 303 by two further shaft seals 345. Between a high-pressure steam inflow region 348 and a steam outlet region 351, the turbine shaft 309 in the high-pressure part-turbine 300 has the high-pressure rotor blading 354, 357. This high-pressure rotor blading 354, 357, together with the associated rotor blades (not shown in more detail), constitutes a first blading region 360. The intermediate-pressure part-turbine 303 has a central steam inflow region 333. Assigned to the steam inflow region 333, the turbine shaft 309 has a radially symmetrical shaft shield 363, a cover plate, on the one hand for dividing the flow of steam between the two flows of the intermediate-pressure part-turbine 303 and also for preventing direct contact between the hot steam and the turbine shaft 309. In the intermediate-pressure part-turbine 303, the turbine shaft 309 has a second blading region 366 comprising the intermediate-pressure rotor blades 354, 342. The hot steam flowing through the second blading region 366 flows out of the intermediate-pressure part-turbine 303 from an outflow connection piece 369 to a low-pressure part-turbine (not shown) which is connected downstream in terms of flow.

The invention claimed is:

1. A turbine component, comprising;
   a substrate material; and
   a protective layer disposed on the substrate material, the protective layer comprising an MCrAlX alloy comprising:
   an element M selected from the group consisting of iron, nickel, and cobalt;
   chromium;
   aluminum;
   an element X selected from the group consisting of yttrium, silicon, hafnium, and the rare earth elements, and
   a halogen in an amount of 100-5000 ppm.

2. The turbine component as claimed in claim 1, wherein the protective layer is applied to the substrate comprising a nickel-base or cobalt-base or iron-base superalloy, and a ceramic thermal barrier coating is applied to the protective layer.

3. The turbine component as claimed in claim 1, wherein the protective layer is used for a turbine blade or vane or a combustion chamber element.

4. The turbine component as claimed in claim 1, wherein a concentration of the halogen in the protective layer has a concentration gradient across a thickness of the protective layer.

5. The turbine component as claimed in claim 1, wherein a concentration of the halogen varies across a depth of the protective layer and is highest in a subregion of the protective layer proximate the substrate.

6. An MCrAlX alloy, comprising:
   an element M selected from the group consisting of iron, nickel, and cobalt;
   chromium;
   aluminum;
   an element X selected from the group consisting of yttrium, silicon, hafnium, and the rare earth elements, and
   a halogen in an amount of 100-5000 ppm.

7. The MCrAlX alloy as claimed in claim 6, wherein the halogen is in an amount of at most 1000 ppm.

8. The MCrAlX alloy as claimed in claim 6, wherein the halogen is present as a halogen compound in the MCrAlX alloy.

9. The MCrAlX alloy as claimed in claim 6, wherein the halogen forms a halogen compound with at least one other constituent of the MCrAlX alloy.

10. The MCrAlX alloy as claimed in claim 6, wherein the halogen comprises an amount of at least 200 ppm.

11. The MCrAlX alloy as claimed in claim 6, wherein a concentration of the halogen across a depth of the alloy has a gradient.

* * * * *